(12) United States Patent
Zusman

(10) Patent No.: US 9,523,626 B2
(45) Date of Patent: Dec. 20, 2016

(54) HAND-HELD VIBRATION SENSOR

(71) Applicant: George V. Zusman, Houston, TX (US)

(72) Inventor: George V. Zusman, Houston, TX (US)

(73) Assignee: PCB Piezotronics, Inc., Depew, NY (US)

( * ) Notice: Subject to any disclaimer, the term of this patent is extended or adjusted under 35 U.S.C. 154(b) by 236 days.

(21) Appl. No.: 14/112,832

(22) PCT Filed: Sep. 28, 2012

(86) PCT No.: PCT/US2012/057704
§ 371 (c)(1),
(2) Date: Oct. 18, 2013

(87) PCT Pub. No.: WO2013/049436
PCT Pub. Date: Apr. 4, 2013

(65) Prior Publication Data
US 2014/0366635 A1    Dec. 18, 2014

Related U.S. Application Data

(60) Provisional application No. 61/540,623, filed on Sep. 29, 2011.

(51) Int. Cl.
*G01M 13/00* (2006.01)
*G01H 1/00* (2006.01)

(52) U.S. Cl.
CPC ............... *G01M 13/00* (2013.01); *G01H 1/00* (2013.01); *G01H 1/003* (2013.01)

(58) Field of Classification Search
CPC ........ G01M 13/045; G01H 1/00; G01H 17/00; G01H 1/06; H01H 1/12

(Continued)

(56) References Cited

U.S. PATENT DOCUMENTS 3,911,731 A    10/1975   Walker et al.
4,520,674 A *   6/1985   Canada .................... G01H 1/00
                                                     702/197

(Continued)

FOREIGN PATENT DOCUMENTS

JP    2004069631     3/2004
JP    2009109339     5/2009
JP    2009109339 A *   5/2009

OTHER PUBLICATIONS

International Search Report of PCT/US2012/057704 mailed Jan. 30, 2013.
Written Opinion of PCT/US2012/057704 mailed Jan. 30, 2013.

*Primary Examiner* — Michael A Lyons
*Assistant Examiner* — Jean Morello
(74) *Attorney, Agent, or Firm* — Michael J. Berchou, Esq.; Timothy W. Menasco, Esq.; Harter Secrest & Emery LLP

(57) ABSTRACT

A hand-held or portable vibration sensor device having a housing and a sensor body which generally provides a single point of contact with the machinery or apparatus for which vibration measurement is desired. In one aspect, the sensor body comprises a vibration sensor element such as an accelerometer for measuring vibration. In another aspect, a force sensor such as a force sensing resistor or load cell is provided to reduce the impact of forces applied to said hand-held vibration sensor such as a force applied through a handle during measurement. In another aspect, a compensation circuit processes the out put from a vibration sensor element to provide a relatively flat frequency response over a desired operational frequency range. The hand-held vibration sensor may also comprise a rubber isolation member disposed between the sensor body and force sensor.

16 Claims, 13 Drawing Sheets

(58) Field of Classification Search
USPC .......................................... 73/658; 702/141
See application file for complete search history.

(56) References Cited

U.S. PATENT DOCUMENTS

| | | | | |
|---|---|---|---|---|
| 5,379,643 | A * | 1/1995 | Taylor | G01P 1/023 |
| | | | | 310/328 |
| 7,966,896 | B2 * | 6/2011 | Chang | G01L 5/24 |
| | | | | 73/760 |
| 8,280,658 | B2 * | 10/2012 | Thompson | G01H 1/00 |
| | | | | 702/63 |
| 2011/0079084 | A1 | 4/2011 | Zusman et al. | |
| 2011/0295556 | A1 * | 12/2011 | Hedin | G01H 1/003 |
| | | | | 702/182 |

\* cited by examiner

HAND-HELD VIBRATION SENSOR

PRIORITY CLAIM

The present application claims priority to U.S. Provisional Patent Application No. 61/540,623, filed Sep. 29, 2011.

TECHNICAL FIELD

The present invention relates generally to vibration measurement and, more specifically, to an improved sensor device and system for measuring vibration. More specifically, the invention relates to a hand-held or portable vibration measurement apparatus and system.

BRIEF SUMMARY OF THE INVENTION

With parenthetical reference to the corresponding parts, portions or surfaces of the disclosed embodiment, merely for purposes of illustration and not by way of limitation, the present invention provides an improved vibration sensor and system. In one embodiment, a hand-held vibration sensor (10) includes a sensor body (20) having a sensor element (21) such as an accelerometer, with a conical sensor body portion having a sharp point (22) which generally provides a single point of contact with the machinery or apparatus for which vibration measurement is desired. In another aspect, the hand-held vibration sensor includes a force sensor (30) to compensate for sensitivity instability due to unstable and/or uncontrolled force(s) applied to the hand-held vibration sensor during measurement. In another aspect, a mechanical isolation member (40) is disposed between the sensor body and the force sensor. In another embodiment, the hand-held vibration sensor includes a self-contained digital readout or display.

DESCRIPTION OF THE PREFERRED EMBODIMENTS

Figure 1:
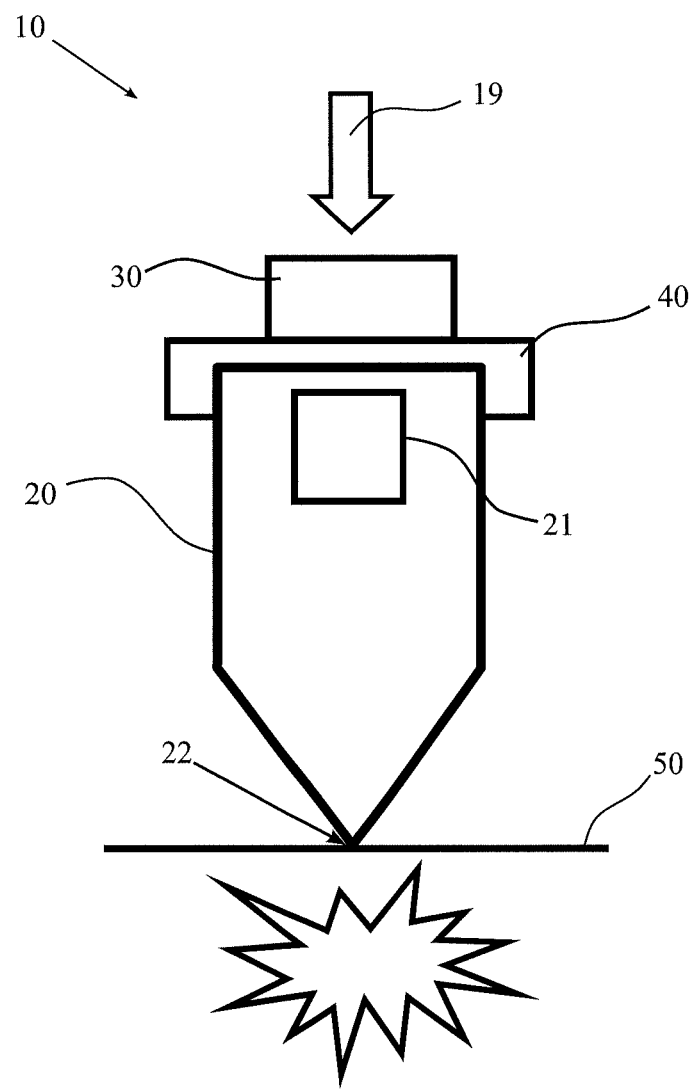
FIG. 1 is a cross-sectional view of an embodiment of an improved vibration sensor device urged against a vibration surface.

At the outset, it should be clearly understood that like reference numerals are intended to identify the same parts, elements or portions consistently throughout the several drawing figures, as such parts, elements or portions may be further described or explained by the entire written specification, of which this detailed description is an integral part. The following description of the preferred embodiments of the present invention are exemplary in nature and are not intended to restrict the scope of the present invention, the manner in which the various aspects of the invention may be implemented, or their applications or uses. Although the claimed subject matter will be described in terms of certain embodiments, other embodiments, including embodiments that do not provide all of the benefits and features set forth herein, are also within the scope of this invention.

Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal," "vertical," "left," "right," "up" and "down," as well as adjectival and adverbial derivatives thereof (e.g., "horizontally," "rightwardly," "upwardly," etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and first, particularly, to FIG. 1 thereof, one preferred embodiment of the hand-held vibration sensor 10 comprises a sensor body 20 having a vibration sensor element 21 such as an embedded accelerometer (e.g. IMI Sensors Series 660 Embedded Accelerometers). In this embodiment, the sensor body 20 has a sharp, hardened end or tip 22 for contact with a vibration surface 50 such as the surface of vibrating and/or rotating machinery or equipment. In this embodiment, the vibration sensor 10 further comprises a force sensor 30 at the end distal from the sensor body. The force sensor 30 may be a force sensing resistor (e.g. Interlink Electronics FSR 400 Series). The force sensor 30 in this embodiment compensates for sensitivity instability due to unstable and/or uncontrolled force(s) applied to the hand-held vibration sensor (such as a force 19 applied through a handle) during measurement.

The vibration sensor in FIG. 1 also comprises a mechanical isolator 40 disposed between the force sensor 30 and sensor body 20. The mechanical isolator in this embodiment comprises silicon rubber or similar material such as plastic or polyurethane.

Figure 2:
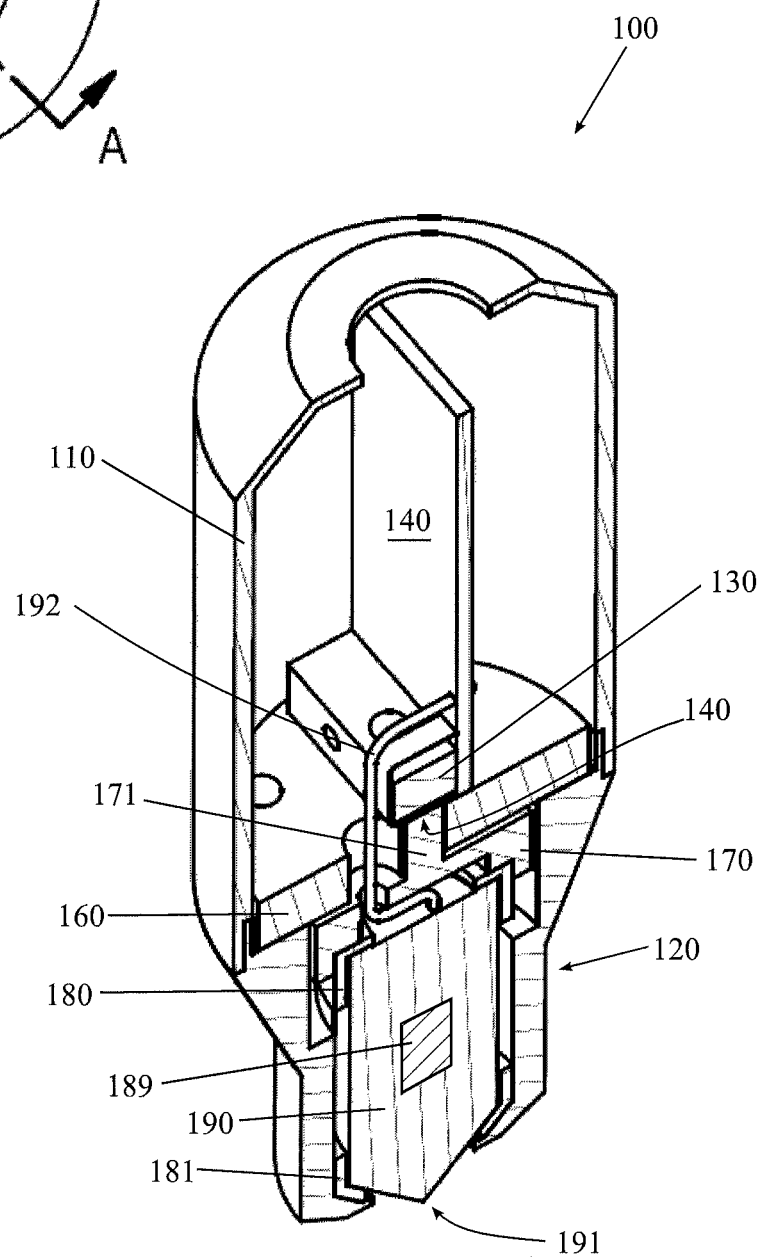
FIG. 2 is a cross-sectional perspective view of a preferred embodiment of an improved vibration sensor device.

FIG. 2 is a cross-sectional perspective view of a preferred embodiment of an improved vibration sensor 100 having a housing 110 and a base 120. In this embodiment, a vibration sensor a sensor body 190 having a generally sharp or pointed end or tip 191 is disposed between a front mechanical isolator 181 (e.g. silicon rubber) and a rear mechanical isolator 180 (e.g. silicon rubber). A sensitive element such as an accelerometer 189 is situated within the sensor body 190.

The housing 110 and base 120 for this device are comprised of, for example, molded plastic or another suitable material. The term housing as used herein also includes a single, unitary piece or enclosure inclusive of a base. An opening in the base 120 is configured such that the generally sharp or pointed end 191 of the sensor body 190 extends therethrough to permit contact with a vibration surface. The sensor body 190 and/or vibration sensor element 189 are electrically connected to a printed circuit assembly or board 140 via one or more wires 192 or other suitable means.

In one embodiment, adjacent to the rear mechanical isolator is a piston 170 (e.g. molded plastic) having a pin portion 171 which extends through a corresponding opening in a support disc 160. The support disc 160 in this embodiment is made of SS 361L or similar material. A support bar 130 is secured to the printed circuit board 140 and the support disc 160 with screws or another known method. The support bar 130 may comprise SS 316L or similar material.

Disposed between the support bar 130 and the support disc 160 is a force sensing resistor 150 such as Interlink Electronics FSR® 400 Series. The force sensor may also be another Interlink Electronics force sensing resister, a Measurement Specialties FC22 series device, a load cell or another device known to those skilled in the art. In the embodiment illustrated in FIG. 2, the force sensing resistor 150 is connected to the circuit board 140 by force sensor cable 151 (illustrated more clearly in FIGS. 5 and 7). The force sensor 150 and/or force sensor cable 151 may be glued or otherwise attached to the support bar 130. A force sensor compression load cell such as FC22-3-1-0000-0010-L may also be used for keyboards and control panels.

The pin portion 171 of the piston 170 is free to move up and down through a corresponding opening in the support disc 160 (illustrated more clearly in FIGS. 5-7) whereby the pin portion 171 comes in contact with the force sensing resistor 150. Preloading is possible depending upon the dimensions and deformation characteristics of the various parts and surfaces. A force applied to the tip 191 of the sensor body 190 is transferred through the piston portion 170 to the to the force sensor 150. Changes in resistance of the force sensor 150 due to applied forces allow for determination/calculation of the magnitude of the applied forces, based on the characteristics of the force sensor.

A threaded connector such as a MIL 5015-style or similar connector may be attached to or incorporated into the housing 110 to provide an electrical connection to the hand-held device through a desired number of pins.

Figure 3:
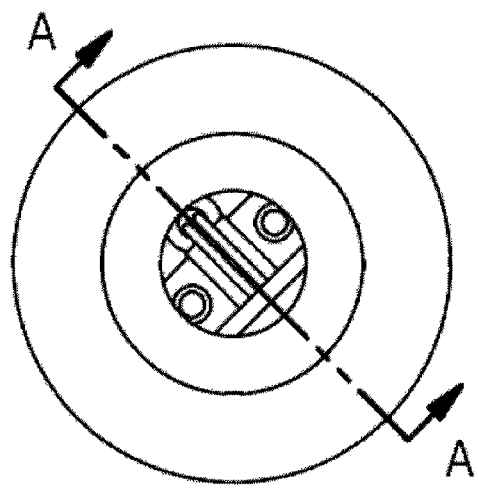
FIG. 3 is a top view of the embodiment illustrated in FIG. 2.
Figure 4:
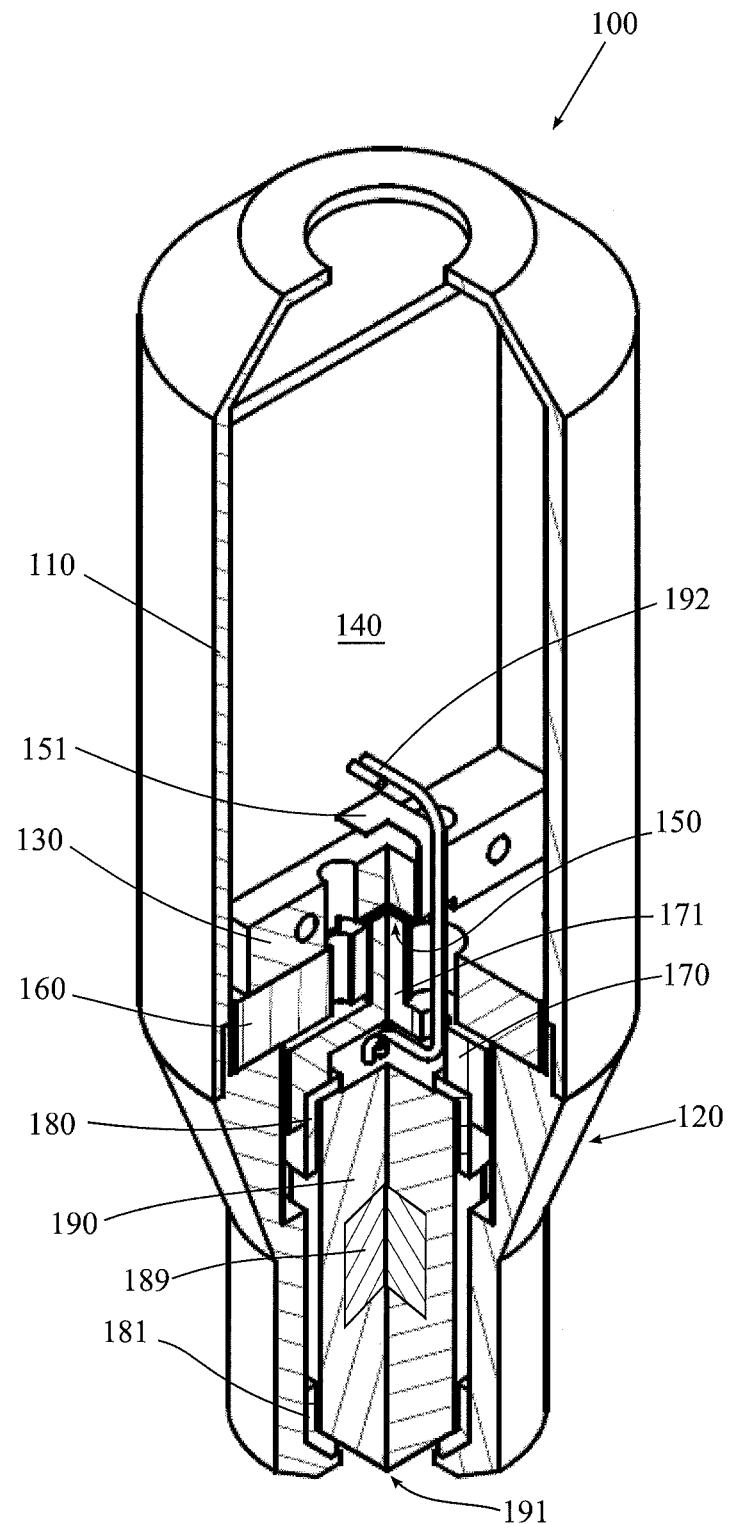
FIG. 4 is a cross-sectional perspective view of the embodiment illustrated in FIG. 2.
Figure 5:
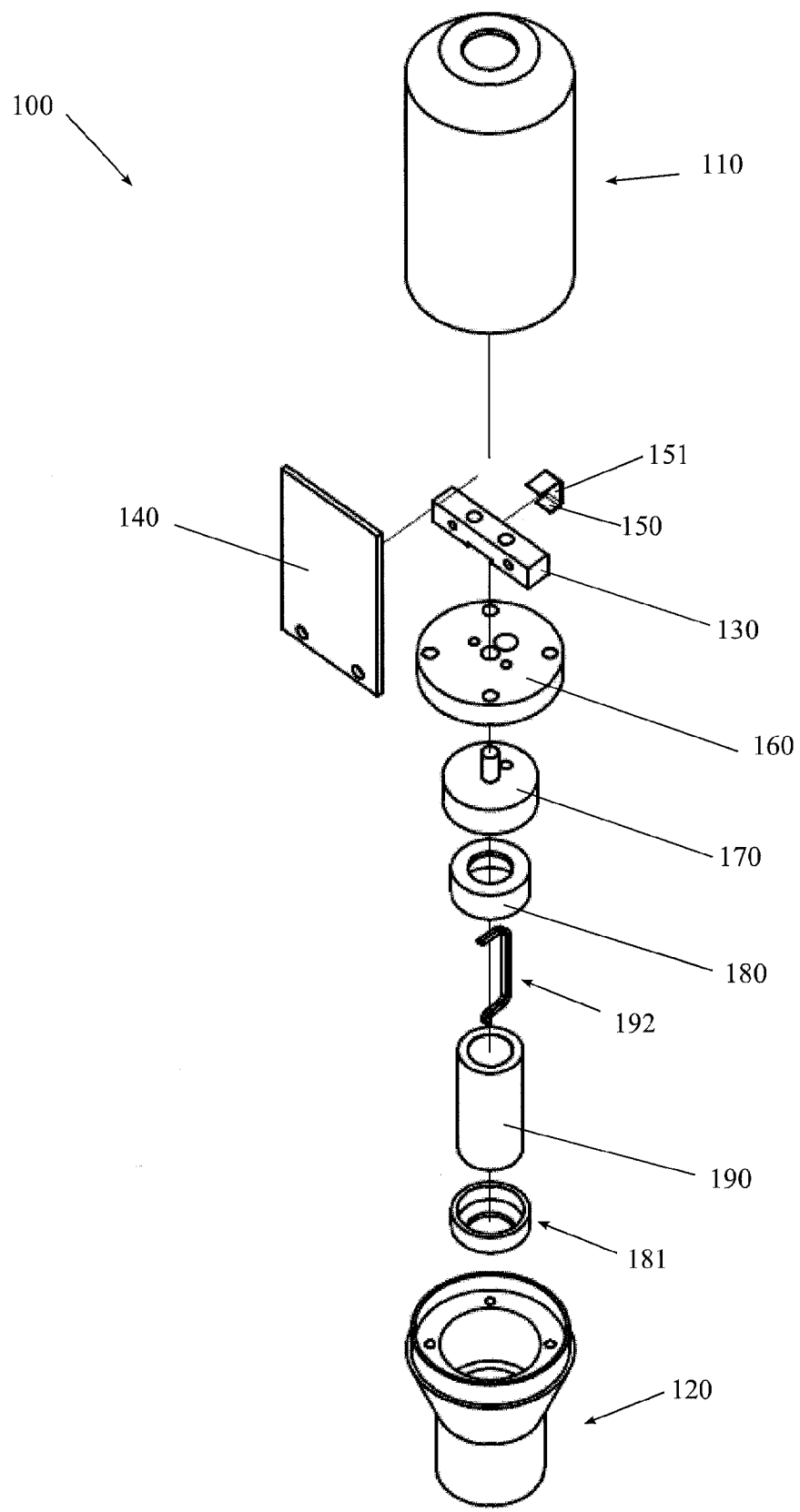
FIG. 5 is an exploded view of the embodiment illustrated in FIG. 2.
Figures 6, 7:
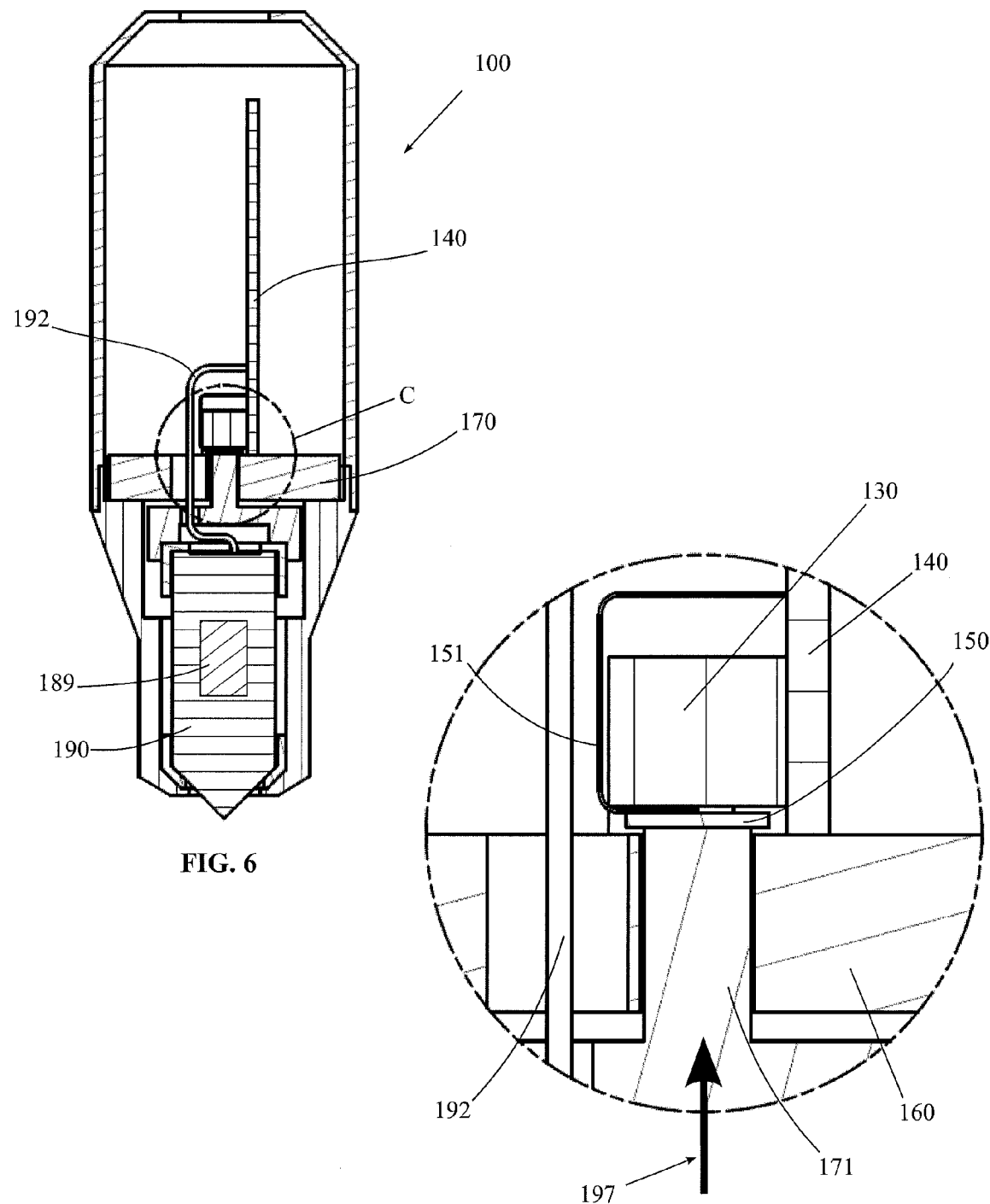
FIG. 6 is a cross-sectional view of the embodiment illustrated in FIG. 2.
FIG. 7 is a magnified view of a portion of the improved vibration sensor illustrated in FIG. 6.

FIG. 3 is a top view of the embodiment described above in FIG. 2. FIG. 4 further illustrates the features of the same embodiment. FIG. 5 is an exploded perspective of this embodiment which illustrates the alignment and orientation of the features described above. FIG. 6 is a cross-sectional view which further illustrates the same features, and FIG. 7 is a magnified view which illustrates, among other things, the pin portion 171 of the piston 170 coming into contact with the force sensor 150 and the connection 151 between the force sensor 150 and circuit bound 140.

Figure 8:
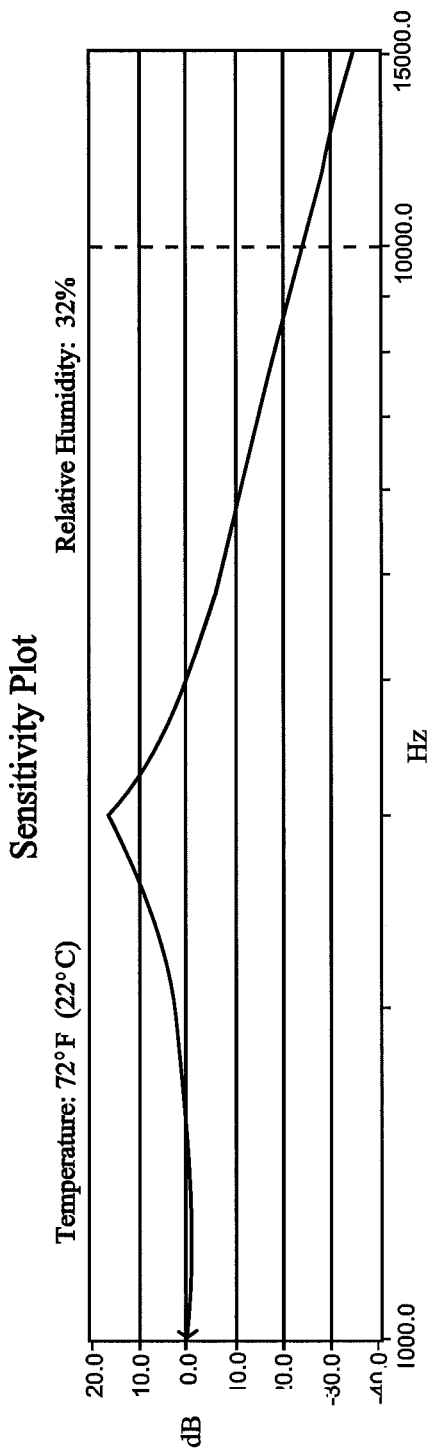
FIG. 8 is a frequency response plot for a preferred embodiment of an improved vibration sensor.

One point metal to metal contact of the tip 22, 191 with the vibration surface, as illustrated in FIG. 1 for example, provides relatively stable after resonance frequency response. Improved frequency response is also provided for machinery which is painted or which has a rugged surface. An example experimental frequency response plot of the embodiment of FIG. 1 is shown in FIG. 8.

Figure 9:
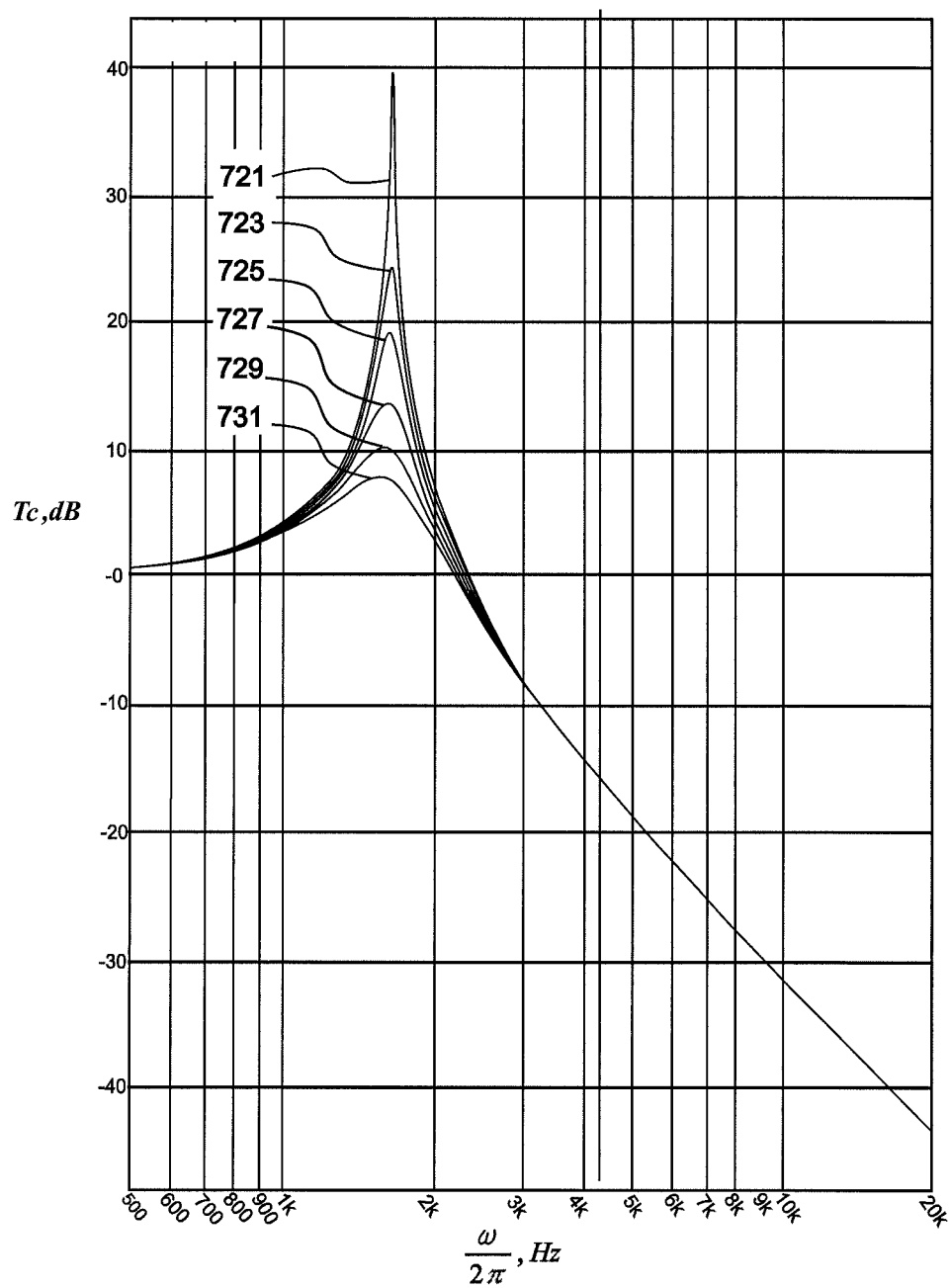
FIG. 9 illustrates a theoretical frequency response plot for a preferred embodiment of an improved vibration sensor device.

The transmissibility function below and the associated plot presented at FIG. 9 further demonstrate that, theoretically, the frequency response for point to point metal contact is linear in logarithmic axes and stable, allowing for vibration measurements in a wide frequency range.

$$T_C = \frac{\sqrt{1 + \left(\xi \frac{\omega}{\omega_N}\right)^2}}{\sqrt{\left[1 - \frac{\omega^2}{\omega_N^2}(1 + \delta\xi)\right]^2 + (\delta + \xi)^2 \frac{\omega^2}{\omega_N^2}}}$$

In the transmissibility function, $\omega$ is frequency, $\omega_N$ is natural (resonance) system frequency, $\xi$ is the parallel damping coefficient, and $\delta$ is the serial damping coefficient. In the FIG. 9 plot, $\xi=0.01$ and $\delta=0$ (721), $\delta=0.05$ (723), $\delta=0.1$ (725), $\delta=0.2$ (727), $\delta=0.3$ (729) and $\delta=0.4$ (731).

Figure 10:
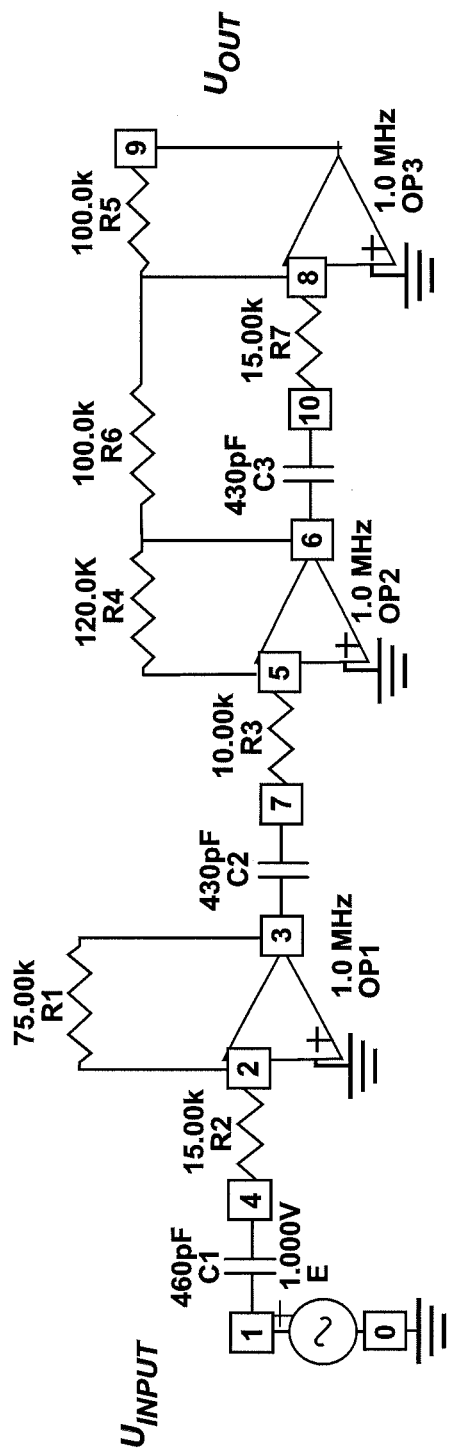
FIG. 10 is a schematic drawing of an embodiment of a compensation circuit.
Figure 11:
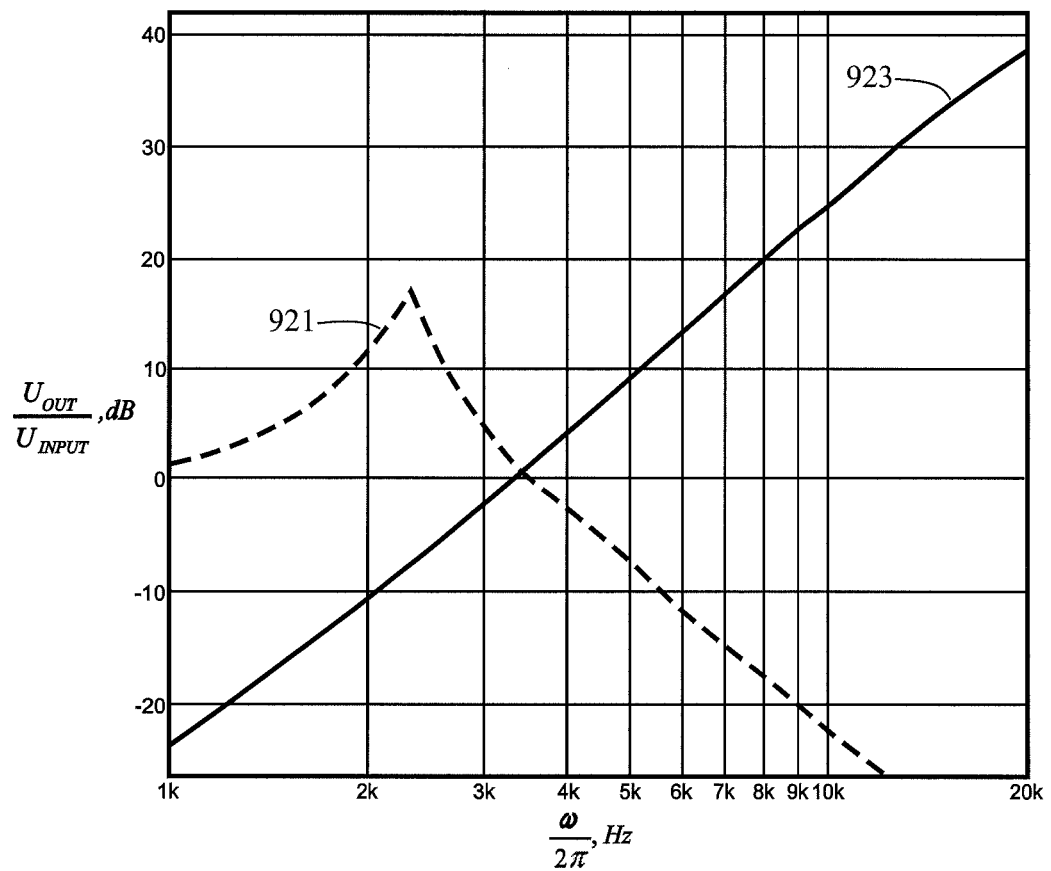
FIG. 11 is an example frequency response plot for a preferred embodiment of an improved vibration sensor.
Figure 12:
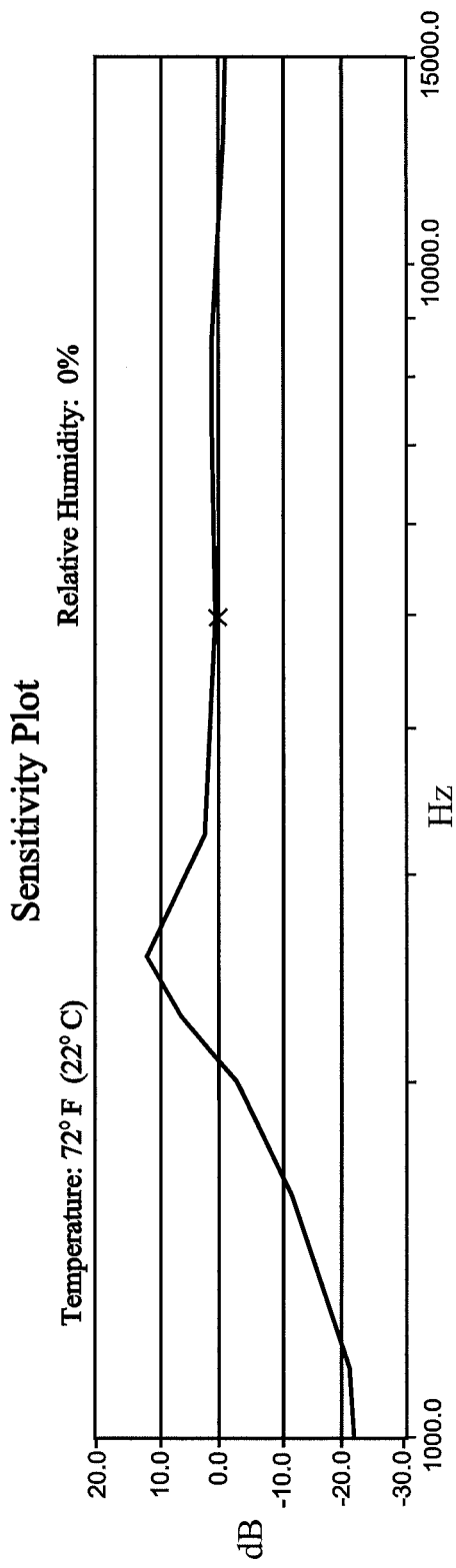
FIG. 12 is an example frequency response plot for a preferred embodiment of an improved vibration sensor.

A schematic of an example circuit which provides compensation for frequency response of the hand-held vibration sensor is shown at FIG. 10, with a corresponding plot of the frequency response of the compensation circuit at FIG. 11, curve 2. Curve 1 in FIG. 11 is the frequency response of the hand-held sensor. FIG. 12 shows the sum of the frequency responses of the compensation circuit and hand-held sensor in series, resulting in a relatively flat frequency response.

The output from the vibration sensor element 21, 189 is input into a compensation circuit such as the circuit illustrated in FIG. 10. Other circuits which provide a linear amplitude-frequency curve may be used (in a range from 4 kHz to 20 kHz, for example).

The compensation circuit provides a relatively flat frequency response over the operational frequency range. Because the output from the compensation circuit is proportional to both the measured vibration and to the force applied to the vibration sensor (for example, through a handle), and because the applied force may be unstable, a force sensor 150 is provided. The value of the force measured by the force sensor is used to improve the accuracy of the vibration measurement by reducing the impact or influence of the applied force. In this regard, the output from the compensation circuit is divided by a value proportional to applied force. In one embodiment, this is accomplished by reading and processing the force sensor output signal with a microprocessor having an analog to digital converter.

Figure 13:
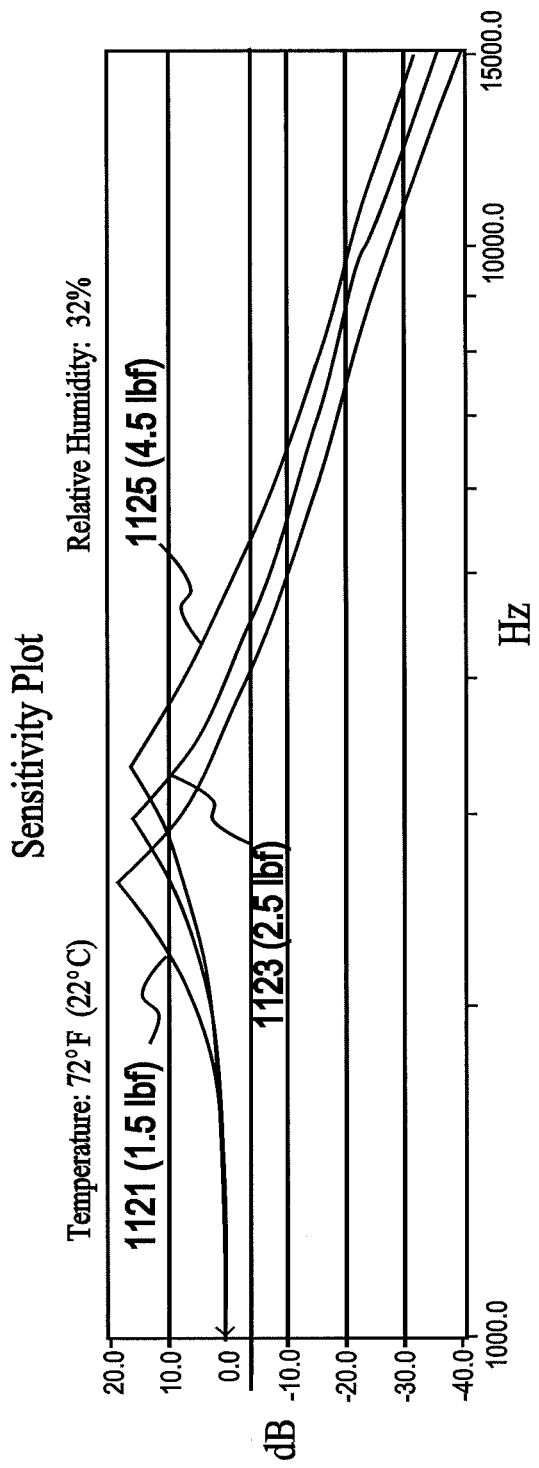
FIG. 13 is an example frequency response plot illustrating various forces applied to a preferred embodiment of an improved vibration sensor.

In FIG. 13, frequency responses for one embodiment of a hand-held vibration sensor having various forces applied (1.5, 2.5 and 4.5 $lb_F$) are presented. In certain embodiments, typical applied forces may range from about 2 lb to 7 lb. Sensitivity in this range may be controlled and compensated.

Figure 14:
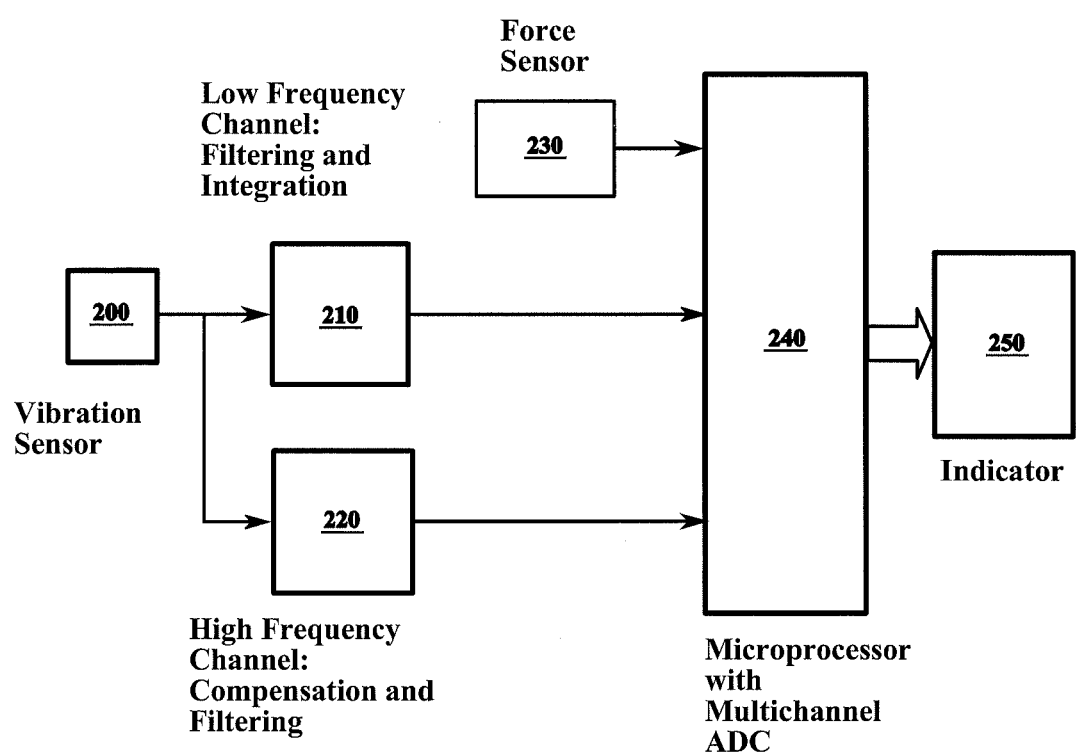
FIG. 14 is a diagram illustrating a preferred embodiment of an improved vibration sensor having a low frequency channel and a high frequency channel.
Figure 15:
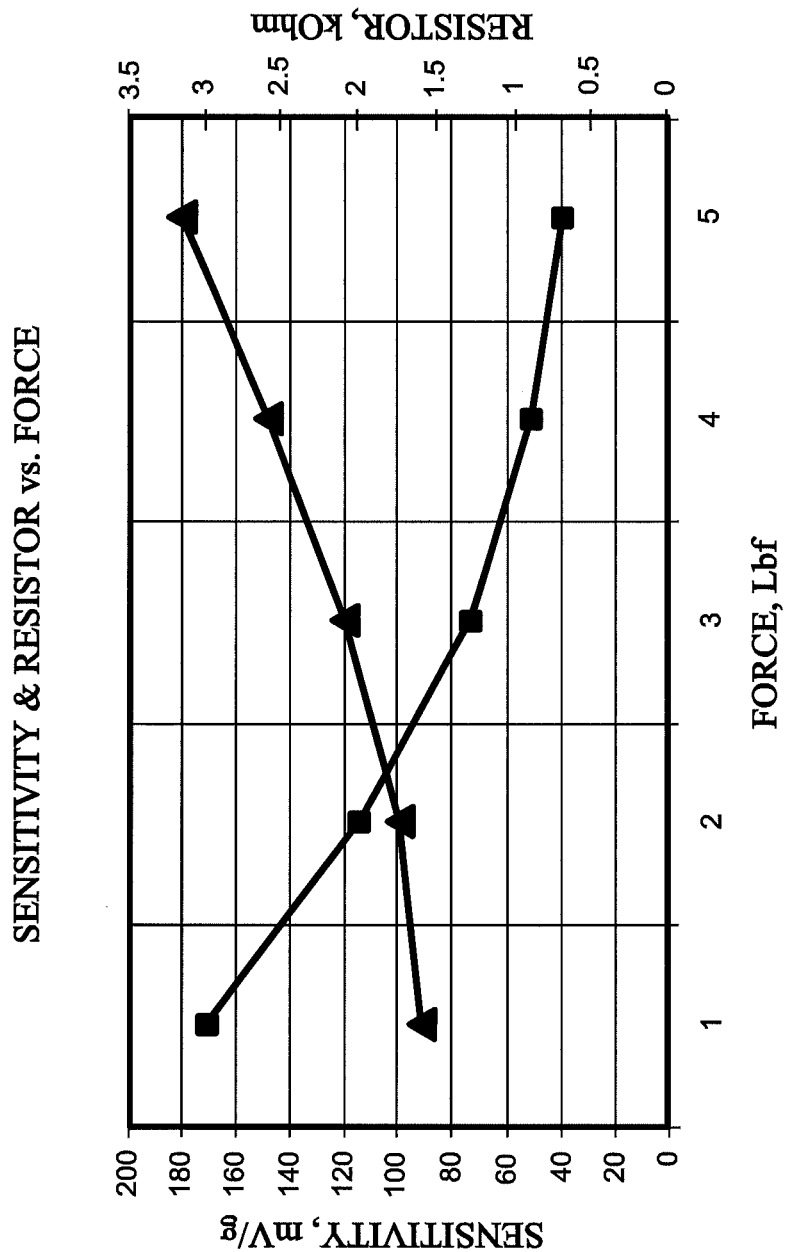
FIG. 15 is a plot of sensitivity and resistance versus applied force for an embodiment of an improved vibration sensor device.

In one embodiment, the hand-held vibration sensor measures low frequency as well as high frequency vibration and consists, for example, of two channels—one for low frequency and one for high frequency—as shown in FIG. 14. The low frequency channel has a traditional structure known to those skilled in the art, such as a gain regulator or amplifier and filters. The high frequency channel may utilize the compensation circuit shown in FIG. 10, for example. Example plots of sensitivity and resistor value of a force sensor versus applied force are shown on FIG. 15. This illustrates the possibility that a microprocessor may compensate for changing sensitivity as the applied force is changed.

The following are examples of various embodiments, features and aspects.

Example 1

A hand-held or portable vibration sensor apparatus for measuring vibration in machinery or equipment, comprising a sensor body with a sensor element such as an embedded accelerometer, wherein the sensor body has a generally pointed or sharp end or tip for contact with a vibration surface.

Example 2

The hand-held or portable vibration sensor apparatus described in Example 1, comprising a force sensor (e.g. force sensing resistor) in communication with the sensor body, for example, through a piston assembly which transmits force applied to the hand-held device to the force sensor.

Example 3

The hand-held or portable vibration sensor apparatus described in Examples 1 or 2, further comprising a compensation circuit having, for example, a plurality of operational amplifiers, wherein said compensation circuit results in a desired frequency response for the sensor apparatus (e.g. allowing for accurate high frequency measurement).

Example 4

The hand-held or portable vibration sensor apparatus described in Examples 1, 2 or 3, consisting of two channels—one for low frequency and one for high frequency. For example, the low frequency channel may comprise a traditional structure known to those skilled in the art, such as a gain regulator or amplifier and filters, and the high frequency channel may comprise the compensation circuit described in Example 3.

Example 5

The hand-held or portable vibration sensor apparatus described in Examples 1, 2, 3 or 4, further comprising a self-contained digital readout or display, said readout or display of a kind known to those skilled in the art.

Example 6

The hand-held or portable vibration sensor apparatus described in examples 1, 2, 3, 4 or 5, further comprising mechanical isolators (e.g. silicon rubber) between the sensor body and the force sensor.

While there has been described what is believed to be the preferred embodiment of the present invention, those skilled in the art will recognize that other and further changes and modifications may be made thereto without departing from the spirit or essential characteristics of the invention. Therefore, the present embodiments are to be considered as illustrative and not restrictive, and the invention is not limited to the specific details and representative embodiments shown and described herein. Accordingly, persons skilled in this art will readily appreciate that various additional changes and modifications may be made without departing from the spirit or scope of the invention, as defined and differentiated by the following claims. In addition, the terminology and phraseology used herein is for purposes of description and should not be regarded as limiting.

What is claimed is:

1. A hand-held vibration sensor, comprising:
a hand-held housing having a base portion;
a sensor body within said base portion, said sensor body having a generally conical portion with a sharp point;
a vibration sensor element within said sensor body, said vibration sensor element measuring vibration and generating a corresponding vibration sensor element output;
a force sensor within said hand-held housing in communication with said sensor body generating a force sensor output corresponding to changes in the resistance of said force sensor as a function of non-vibrational forces applied to the hand-held vibration sensor;
an analog-to-digital converter within said hand-held housing and coupled to said vibration sensor element; and
a microprocessor within said hand-held housing adjusting said vibration sensor element output as a function of said force sensor output to reduce the impact of said non-vibrational applied forces on said vibration sensor element output, said microprocessor coupled to said analog-to-digital converter.

2. The hand-held vibration sensor of claim 1 wherein said vibration sensor element is an accelerometer.

3. The hand-held vibration sensor of claim 1 wherein said force sensor is a force sensing resistor or load cell.

4. The hand-held sensor of claim 1, further comprising:
a compressible mechanical isolation member interposed between said sensor body and said force sensor.

5. The hand-held sensor of claim 4 wherein said compressible mechanical isolation member comprises rubber, plastic or polyurethane.

6. The hand-held sensor of claim 1, further comprising:
a compensation circuit in electrical communication with said vibration sensor element, said compensation circuit receiving said vibration sensor element output and processing said vibration sensor output such that a relativity flat frequency response results over a desired operational frequency range.

7. The hand-held sensor of claim 1, further comprising:
a high frequency channel comprising a compensation circuit in electrical communication with said vibration sensor element, said compensation circuit receiving said vibration sensor element output and processing said vibration sensor output such that a relativity flat frequency response results over a desired high frequency range; and
a low frequency channel comprising a gain regulator, amplifier or filter.

8. The hand-held sensor of claim 1, further comprising:
a display on said housing in communication with said microprocessor, said display displaying said adjusted vibration sensor element output.

9. A hand-held vibration sensor for measuring vibration in a machine, comprising:
a sensor body having a generally conical portion with a sharp point;
an accelerometer within said sensor body measuring vibration and generating a corresponding accelerometer output representative of vibration present in a machine contacted by said sharp point;
a compensation circuit in electrical communication with said accelerometer, said compensation circuit receiving said accelerometer output and providing a relativity flat frequency response over a desired operational frequency range;
a force sensing resistor in communication with said sensor body, said force sensing resistor generating a force sensor output as a function of forces applied to the hand-held vibration sensor by a user; and
means for adjusting said accelerometer output as a function of said force sensor output, wherein said sensor body, said accelerometer, said compensation circuit, and said force sensing resistor are contained within a single hand-held housing.

10. The hand-held sensor of claim 9, further comprising: a compressible isolation member interposed between said sensor body and said force sensing resistor, said compressible isolation member comprising rubber, plastic or polyurethane.

11. A hand-held vibration sensor for measuring vibration in a machine, comprising:
a hand-held housing having a base portion;
a sensor body within said base portion, said sensor body having a generally conical portion with a sharp point;
a vibration sensor element within said hand-held housing coupled to said sensor body, said vibration sensor element having a vibration sensor element output representative of vibration present in a machine contacted by said sharp point;
a force sensor within said hand-held housing in communication with said sensor body generating a force sensor output corresponding to the resistance of said force sensor as a function of forces applied to the hand-held vibration sensor by a user;
a processor within said hand-held housing receiving said vibration sensor element output and said force sensor output, said processor adjusting said vibration sensor element output as a function of said force sensor output to reduce the impact of said user applied forces on said vibration sensor element output.

12. The hand-held vibration sensor of claim 11 wherein said vibration sensor element is an accelerometer.

13. The hand-held vibration sensor of claim 11 wherein said force sensor is a force sensing resistor or a load cell.

14. The hand-held sensor of claim 11, further comprising: a rubber isolation member interposed between said sensor body and said force sensor.

15. The hand-held sensor of claim 11, further comprising: a compensation circuit in electrical communication with said vibration sensor element, said compensation circuit receiving said vibration sensor element output and producing a relativity flat frequency response over a desired operational frequency range.

16. The hand-held sensor of claim 11, further comprising:
a high frequency channel comprising a compensation circuit in electrical communication with said vibration sensor element, said compensation circuit receiving said vibration sensor element output and processing high frequency signals; and
a low frequency channel processing low frequency signals.

* * * * *